(12) United States Patent
Rapant et al.

(10) Patent No.: US 11,742,710 B2
(45) Date of Patent: Aug. 29, 2023

(54) ROTOR ASSEMBLY FOR AN ELECTRIC MOTOR

(71) Applicant: MILWAUKEE ELECTRIC TOOL CORPORATION, Brookfield, WI (US)

(72) Inventors: Russell M. Rapant, Menomonee Falls, WI (US); Andrew T. Beyerl, Pewaukee, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 276 days.

(21) Appl. No.: 16/698,283

(22) Filed: Nov. 27, 2019

(65) Prior Publication Data

US 2020/0177041 A1     Jun. 4, 2020

Related U.S. Application Data

(60) Provisional application No. 62/772,924, filed on Nov. 29, 2018.

(51) Int. Cl.
*H02K 1/28* (2006.01)
*H02K 15/12* (2006.01)
*H02K 1/17* (2006.01)

(52) U.S. Cl.
CPC ............... *H02K 1/28* (2013.01); *H02K 1/17* (2013.01); *H02K 15/12* (2013.01); *Y10T 29/53143* (2015.01)

(58) Field of Classification Search
CPC .. H02K 9/06; H02K 5/18; H02K 9/04; H02K 1/27; H02K 2201/06; H02K 1/28; Y10T 29/49012; Y10T 29/49009; Y10T 29/49071; Y10T 29/49073; Y10T 29/53143

USPC ......... 29/732, 557, 558, 592, 596–598, 605, 29/606, 729, 738
See application file for complete search history.

(56) References Cited

U.S. PATENT DOCUMENTS

| | | | |
|---|---|---|---|
| 4,883,408 A | 11/1989 | Borcherding | |
| 5,329,199 A | 7/1994 | Yockey et al. | |
| 5,536,985 A | 7/1996 | Ward et al. | |
| 6,735,846 B2 | 5/2004 | Du | |

(Continued)

FOREIGN PATENT DOCUMENTS

| | | |
|---|---|---|
| CN | 201307810 Y | 9/2009 |
| CN | 204243940 U | 4/2015 |

(Continued)

OTHER PUBLICATIONS

International Search Report and Written Opinion for Application No. PCT/US2019/063682 dated Mar. 23, 2020 (7 pages).

(Continued)

*Primary Examiner* — Thiem D Phan
(74) *Attorney, Agent, or Firm* — Michael Best & Friedrich LLP

(57) ABSTRACT

An electric motor includes a stator and a rotor assembly received in the stator. The rotor assembly includes a rotor body having a lamination stack, and an integral fan and magnet retention formed by molding an insulative material to the lamination stack. The rotor assembly also includes a shaft pressed into the rotor body. The shaft is pressed into the rotor body after the insulative material is molded to the lamination stack to form the integral fan and magnet retention.

13 Claims, 7 Drawing Sheets

(56) References Cited

U.S. PATENT DOCUMENTS

| | | |
|---|---|---|
| 6,819,022 B2 | 11/2004 | Yamamoto et al. |
| 6,946,758 B2 | 9/2005 | Du et al. |
| 7,013,552 B2 | 3/2006 | Du |
| 7,096,566 B2 | 8/2006 | Du et al. |
| 7,215,048 B2 | 5/2007 | Du et al. |
| 7,464,455 B2 | 12/2008 | Du et al. |
| 7,591,063 B2 | 9/2009 | West |
| 7,685,697 B2 | 3/2010 | Du et al. |
| 7,814,641 B2 | 10/2010 | Du et al. |
| 7,847,457 B2 | 12/2010 | Achor |
| 8,203,239 B2 | 6/2012 | Du et al. |
| 8,291,574 B2 | 10/2012 | Achor |
| 8,324,764 B2 | 12/2012 | Du et al. |
| 8,850,690 B2 | 10/2014 | Du et al. |
| 8,896,176 B2 | 11/2014 | Ryu et al. |
| 8,901,787 B2 | 12/2014 | Du et al. |
| 8,937,412 B2 | 1/2015 | Du et al. |
| 8,987,964 B2 | 3/2015 | Achor |
| 8,997,332 B2 | 4/2015 | Du et al. |
| 9,472,989 B2 | 10/2016 | Du et al. |
| 9,755,490 B2 | 9/2017 | Inuzuka |
| 10,205,365 B2 * | 2/2019 | Beyerl .................. H02K 7/086 |
| 2006/0261694 A1 | 11/2006 | Chien-Hsiung et al. |
| 2006/0273679 A1 | 12/2006 | Iwase et al. |
| 2011/0293448 A1 | 12/2011 | Ishiguro |
| 2012/0183417 A1 | 7/2012 | Linnenbrock et al. |
| 2014/0125158 A1 | 5/2014 | Hessenberger et al. |
| 2016/0181891 A1 | 6/2016 | Fogle et al. |
| 2016/0197535 A1 | 7/2016 | De Filippis et al. |
| 2017/0207669 A1 | 7/2017 | Zhang et al. |
| 2017/0288499 A1 | 10/2017 | Beyerl et al. |
| 2017/0346364 A1 | 11/2017 | Hessenberger et al. |
| 2017/0373569 A1 | 12/2017 | Fung et al. |

FOREIGN PATENT DOCUMENTS

| | | |
|---|---|---|
| CN | 205489850 U | 8/2016 |
| CN | 107147256 A | 9/2017 |
| CN | 207304189 U | 5/2018 |
| CN | 108494127 A | 9/2018 |
| DE | 102007060011 A1 | 7/2009 |
| EP | 2824810 A1 | 1/2015 |
| EP | 2963775 A1 | 1/2016 |
| JP | 2007209178 A | 8/2007 |
| JP | 2012139070 A | 7/2012 |
| KR | 2019990036381 U | 9/1999 |
| KR | 1020030023279 A | 3/2003 |
| KR | 1020180020041 A | 2/2018 |
| KR | 101842760 B1 | 3/2018 |
| WO | 2018103969 A1 | 6/2018 |

OTHER PUBLICATIONS

International Search Report and Written Opinion for Application No. PCT/US2021/041363 dated Oct. 29, 2021 (14 pages).

Extended European Search Report for Application No. 19888772.1 dated Jul. 29, 2022 (10 pages).

* cited by examiner

ROTOR ASSEMBLY FOR AN ELECTRIC MOTOR

CROSS-REFERENCE TO RELATED APPLICATIONS

This application claims priority to U.S. Provisional Patent Application No. 62/772,924, filed on Nov. 29, 2018, the entire contents of which is incorporated herein by reference.

FIELD OF THE INVENTION

The present invention relates to power tools, and more particularly to power tools including electric motors having a molded rotor assembly.

BACKGROUND OF THE INVENTION

Tools, such as power tools, can include an electric motor having a rotor assembly to rotate a shaft and generate a torque output. The rotor assembly may include a fan molded to a lamination stack to form a rotor body, and the shaft may be pressed into the rotor body to form the rotor assembly.

SUMMARY OF THE INVENTION

In one construction, an electric motor includes a stator and a rotor assembly received in the stator. The rotor assembly includes a rotor body having a lamination stack, and an integral fan and magnet retention formed by molding an insulative material to the lamination stack. The rotor assembly also includes a shaft pressed into the rotor body. The shaft is pressed into the rotor body after the insulative material is molded to the lamination stack to form the integral fan and magnet retention.

In another construction, a method for forming a molded rotor assembly for an electric motor includes a step of providing a lamination stack. The method also includes a step of molding an insulative material to the lamination stack to form an integral fan and magnet retention coupled to the lamination stack, the lamination stack and the integral fan and magnet retention together forming a rotor body. The method further includes a step of pressing a shaft into a central aperture formed in the rotor body to achieve a press-fit engagement between the shaft and the lamination stack.

Other aspects of the application will become apparent by consideration of the detailed description and accompanying drawings.

Before any embodiments of the application are explained in detail, it is to be understood that the application is not limited in its application to the details of construction and the arrangement of components set forth in the following description or illustrated in the following drawings. The application is capable of other embodiments and of being practiced or of being carried out in various ways.

DETAILED DESCRIPTION

Figure 1:
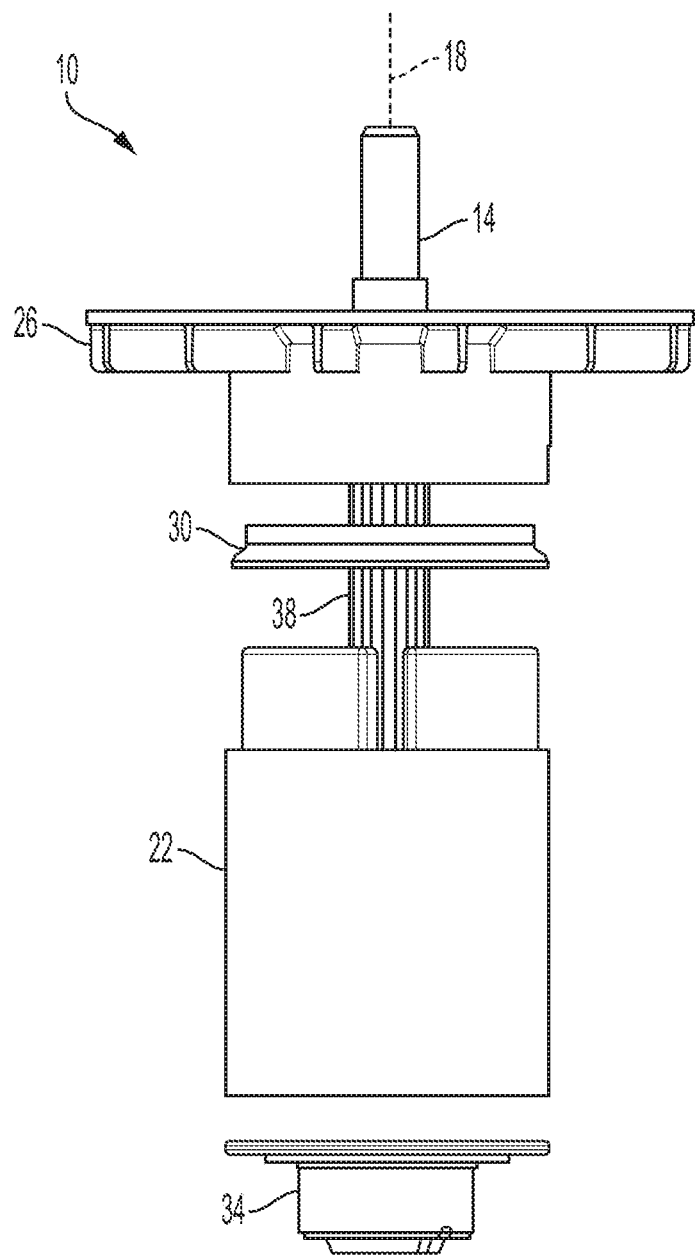
FIG. 1 is an exploded view of a prior art rotor assembly for an electric motor.
Figure 2:
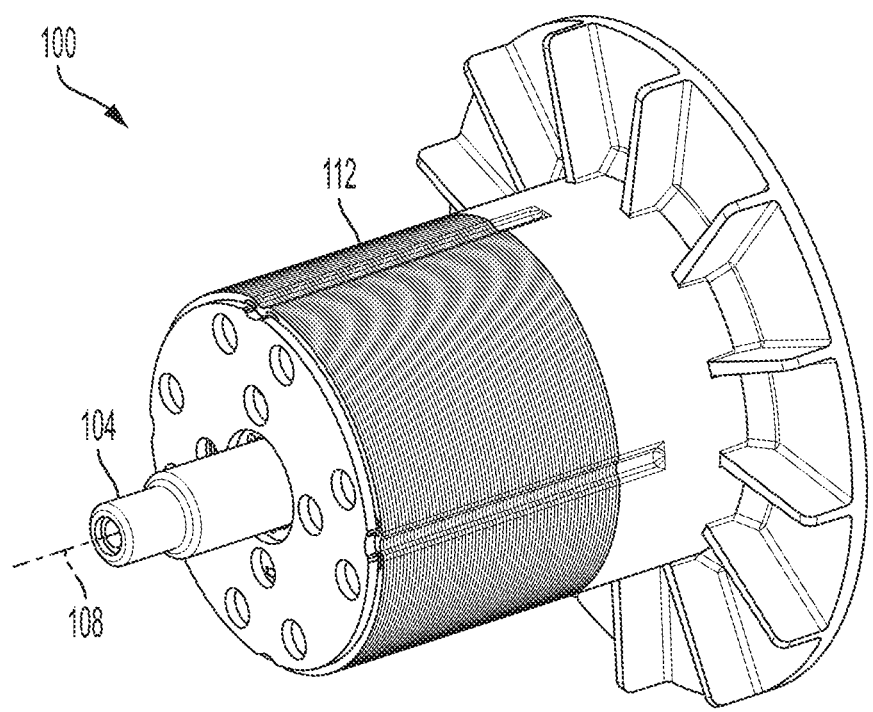
FIG. 2 is a perspective view of a rotor assembly according to an embodiment of the present invention.
Figure 3:
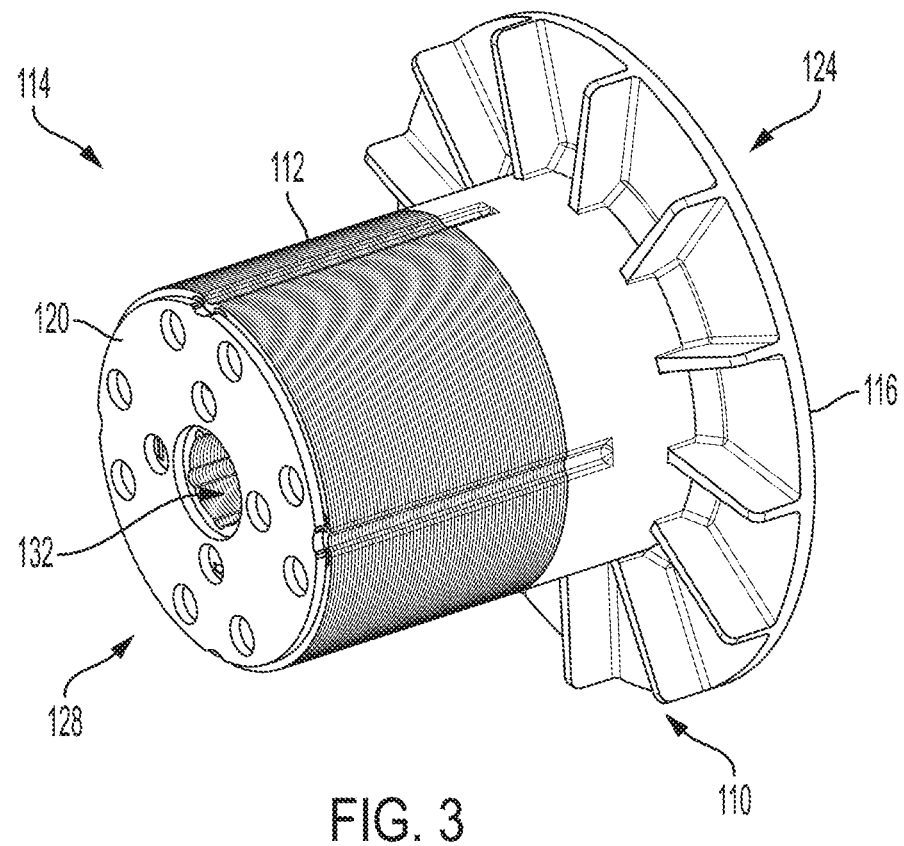
FIG. 3 is a perspective view of a rotor body of the rotor assembly of FIG. 2.
Figure 4:
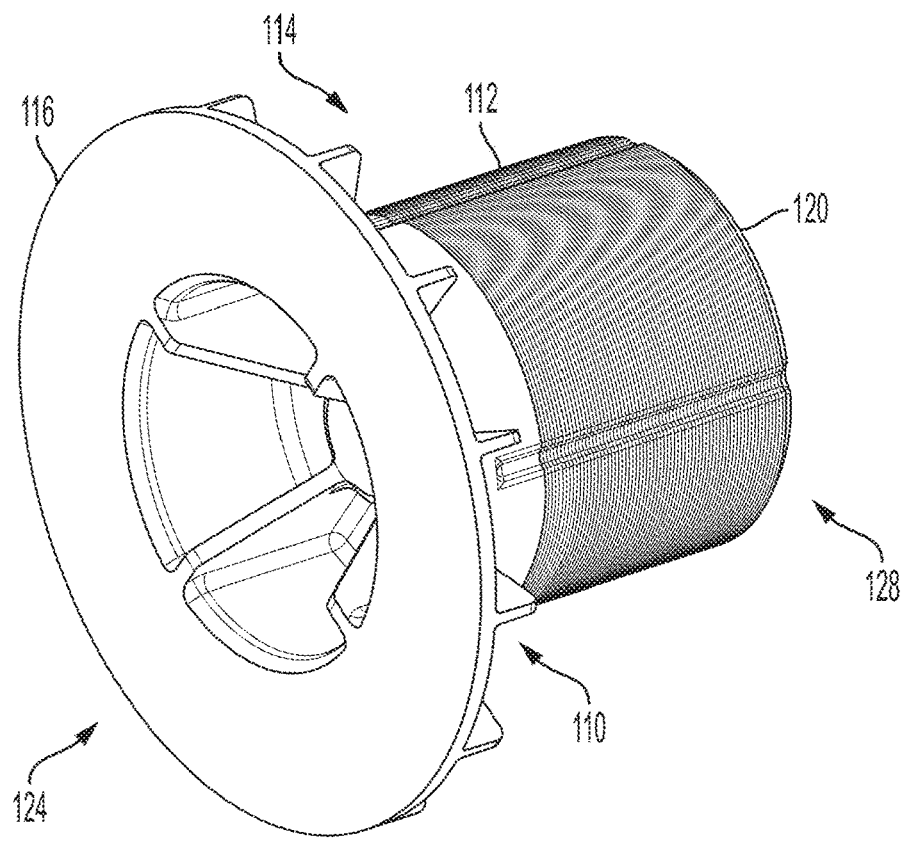
FIG. 4 is another perspective view of the rotor body of FIG. 3.
Figure 5:
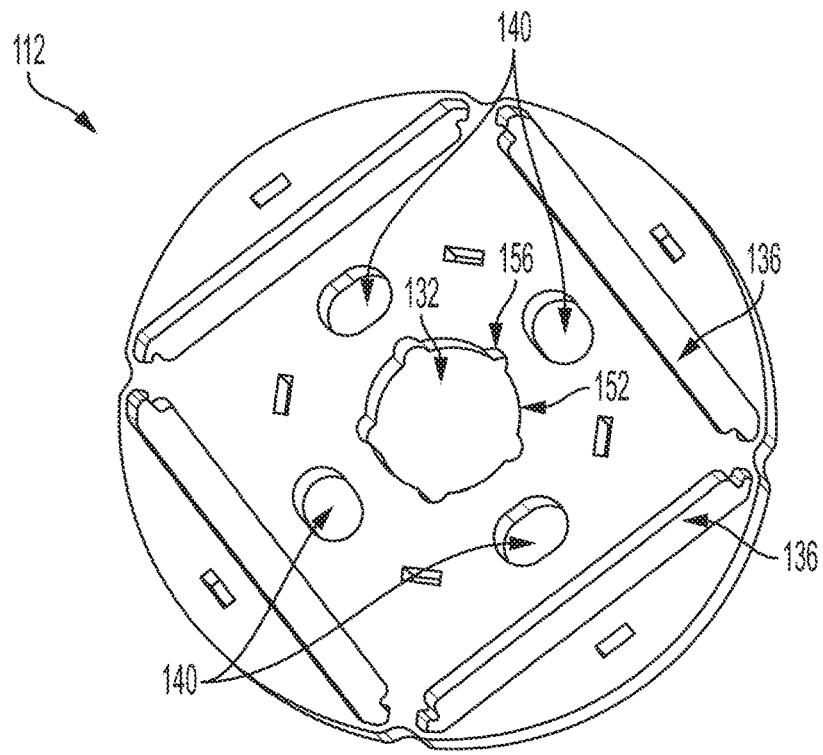
FIG. 5 is an end view of a lamination stack of the rotor assembly of FIG. 2.

FIG. 1 illustrates an exploded view of a prior art rotor assembly 10 for an electric motor (not shown). The rotor assembly 10 is supported for rotation with respect to a stator (not shown) and includes a solid shaft 14 that extends along a longitudinal or rotational axis 18. The rotor assembly 10 also includes a lamination stack 22, a fan 26, a rubber ring 30, and a balance bushing 34. The lamination stack 22 is formed from a plurality of laminations that are stacked along the rotational axis 18. The shaft 14 is received into a central aperture (not shown) formed in the lamination stack 22. The fan 26 is coupled to the shaft 14 adjacent the lamination stack 22 so that the fan 26 rotates with the shaft 14 and provides cooling air to the electric motor. The rubber ring 30 is disposed between the fan 26 and the lamination stack 22. The balance bushing 34 is coupled to the shaft 14 adjacent the lamination stack 22 and opposite the fan 26 to rotationally balance the rotor assembly 10.

An outer surface of the shaft 14 includes knurls or splines 38 that engage the central aperture of the lamination stack 22 to rotatably fix the lamination stack 22 to the shaft 14. Moreover, the central aperture of the lamination stack 22 includes notches (not shown) that are used for orientation of parts for magnetization of magnets during the assembly process. In the prior art rotor assembly 10, imperfect knurls formed on the shaft 14 combined with the notches in the lamination stack 22 can be a source of imbalance in the rotor assembly 10. Thus, the balance bushing 34 is required to balance the rotor assembly 10.

FIGS. 2-9 illustrate a molded rotor assembly 100 (and portions thereof) for an electric motor (not shown) according to the present invention. The electric motor may be used in various different tools, such as power tools (e.g., rotary hammers, pipe threaders, cutting tools, etc.), outdoor tools (e.g., trimmers, pole saws, blowers, etc.), and other electrical devices (e.g., motorized devices, etc.).

The electric motor is configured as a brushless DC motor. In some embodiments, the motor may receive power from an on-board power source (e.g., a battery, not shown). The battery may include any of a number of different nominal voltages (e.g., 12V, 18V, etc.), and may be configured having any of a number of different chemistries (e.g., lithium-ion, nickel-cadmium, etc.). Alternatively, the motor may be powered by a remote power source (e.g., a household electrical outlet) through a power cord. The motor includes a substantially cylindrical stator (not shown) operable to produce a magnetic field. The rotor assembly 100 is rotatably supported by a solid shaft 104 and configured to co-rotate with the shaft 104 about a longitudinal or rotational axis 108.

The rotor assembly 100 includes an integral fan and magnet retention 110 or main body (FIG. 6) formed of an insulative material (e.g., plastic) that is molded to a lamination stack 112 to form a rotor body 114. The integral fan and magnet retention 110 includes a fan portion 116 and a magnet retention portion 120 formed opposite the fan portion 116. When the integral fan and magnet retention 110 is molded to the lamination stack 112, the fan portion 116 abuts one end of the lamination stack 112 to define a fan end 124 of the rotor body 114, and the magnet retention portion 120 abuts an opposite end of the lamination stack 112 to define a magnet retention end 128.

Figure 6:
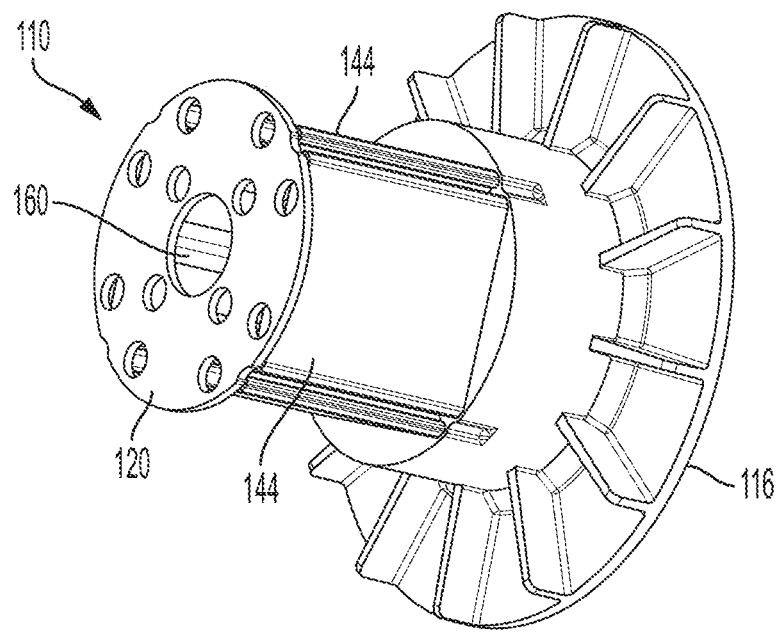
FIG. 6 is a perspective view of an integral fan and magnet retention of the rotor assembly of FIG. 2.

The lamination stack 112 defines a longitudinally extending central aperture 132 that receives the shaft 104 by press-fit engagement. Magnet slots 136 (FIG. 5) are formed in the lamination stack 112 and configured to receive permanent magnets (not shown). The lamination stack 112 also includes injection channels 140 formed about the central aperture 132 and extending longitudinally between the fan end 124 and magnet retention end 128. When the integral fan and magnet retention 110 is molded to the lamination stack 112, the insulative material of the integral fan and magnet retention 110 flows through the channels 140 and joins the fan portion 116 to the magnet retention portion 120. The insulative material also extends around the magnets within the magnet slots 136 to form magnet holding portions 144 (FIG. 6). The magnet holding portions 144 extend through the magnet slots 136 between the fan portion 116 and the magnet retention portion 120, and surround the permanent magnets to retain the magnets within the slots 136.

Figure 7:
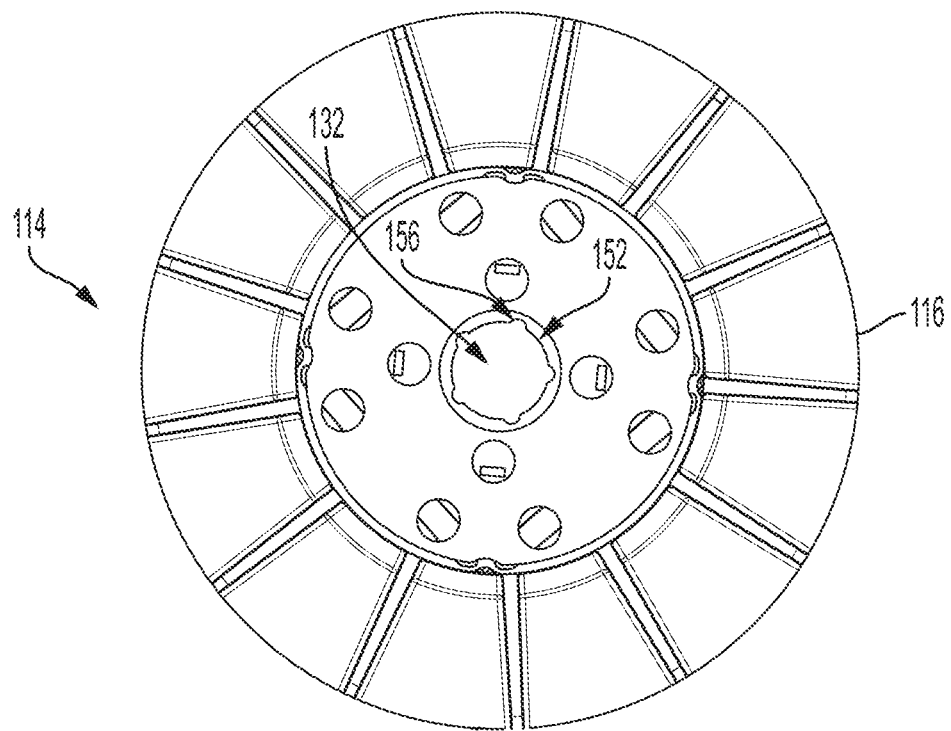
FIG. 7 is and end view of the rotor body of FIG. 3.
Figure 8:
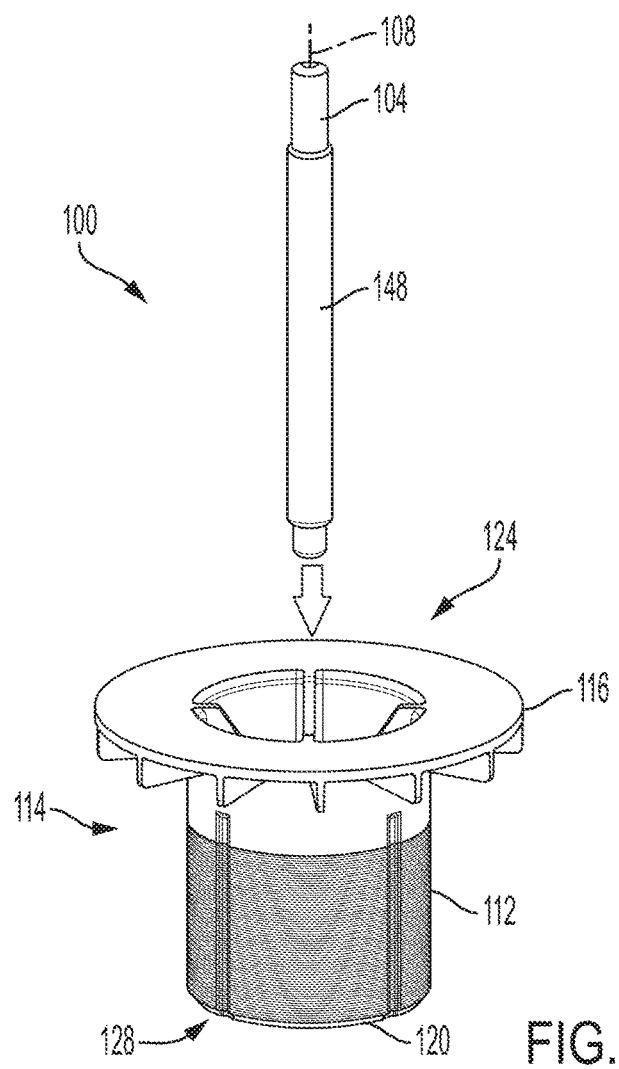
FIG. 8 is a partially exploded view of the rotor assembly of FIG. 2.

The rotor body 114 is secured to the shaft 104 by interference fit (e.g., by press-fit) to form the molded rotor assembly 100. With reference to FIGS. 7 and 8, unlike the prior art shaft 14 having splines 38 described above, the shaft 104 of the present invention includes a smooth annular outer surface 148. In the illustrated embodiment, the smooth annular outer surface 148 is cylindrical and devoid of splines or other retention features. The central aperture 132 of the lamination stack 112 is partially defined by press-fit portions 152 (FIG. 7) that contact and engage the smooth annular outer surface 148 of the shaft 104 to transfer torque between the rotor body 114 and the shaft 104. The central aperture 132 is further defined by relief notches 156 formed in the lamination stack 112 between adjacent press-fit portions 152 to relieve stresses during the pressing process. By providing the shaft 104 with the smooth annular outer surface 148 and pressing the shaft 104 into the central aperture 132, the rotor assembly 100 of the present invention eliminates the imbalance issue associated with the prior art splines 38. Thus, the rubber ring 30 and the balance bushing 34 of the prior art rotor assembly 10 are eliminated in the molded rotor assembly 100.

In known prior art electric motors in which the fan is molded to the lamination stack and the shaft engages the lamination stack by press-fit, the shaft is pressed into the lamination stack prior to the molding process. In the molded rotor assembly 100 of the present invention, the shaft 104 is pressed into the rotor body 114 after the integral fan and magnet retention 110 is molded to the lamination stack 112. This avoids the costs of having many sets of molding inserts for different shaft sizes and reduces the cost of the shaft 104 itself.

Figure 9:
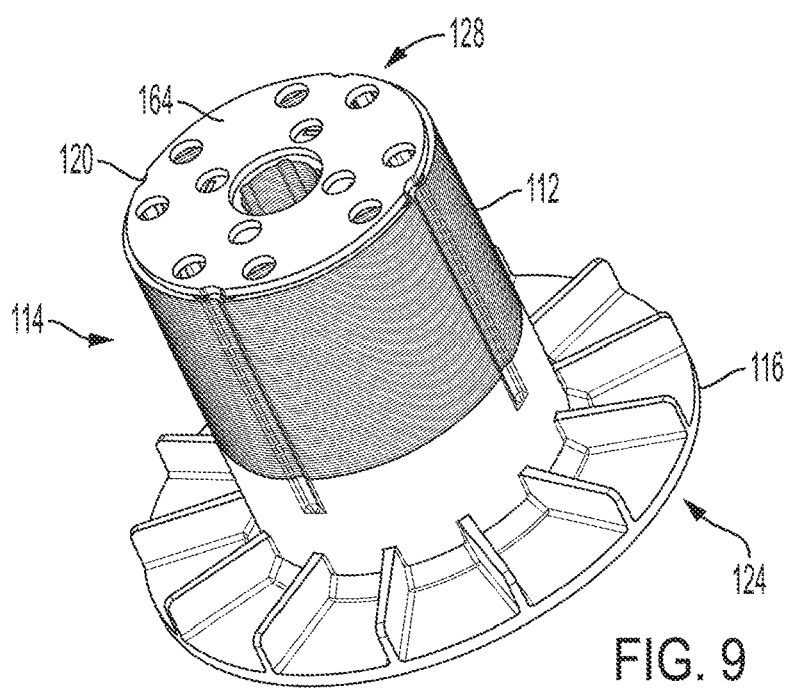
FIG. 9 is another perspective view of the rotor body of FIG. 3.

The shaft 104 is pressed into the rotor body 114 from the fan end 124 as indicated by the arrow shown in FIG. 8, and the rotor body 114 is supported at the magnet retention end 128 during pressing. The fan portion 116 and the magnet retention portion 120 each include shaft openings 160 (FIG. 6) that correspond to the central aperture 132 to permit the shaft 104 to pass therethrough. With reference to FIG. 9, the magnet retention portion 120 defines a bearing surface 164, and the rotor body 114 is supported at the bearing surface 164 as the shaft 104 is pressed into the rotor body 114 from the fan end 124. In other embodiments (not shown), the bearing surface may alternatively be provided on the fan portion 116. In such embodiments, the shaft 104 may be pressed into the rotor body 114 from the magnet retention end 128 (i.e., in a direction opposite to the arrow shown in FIG. 8). A fixture (not shown) may be employed to support the rotor body 114 during pressing.

Figure 10:
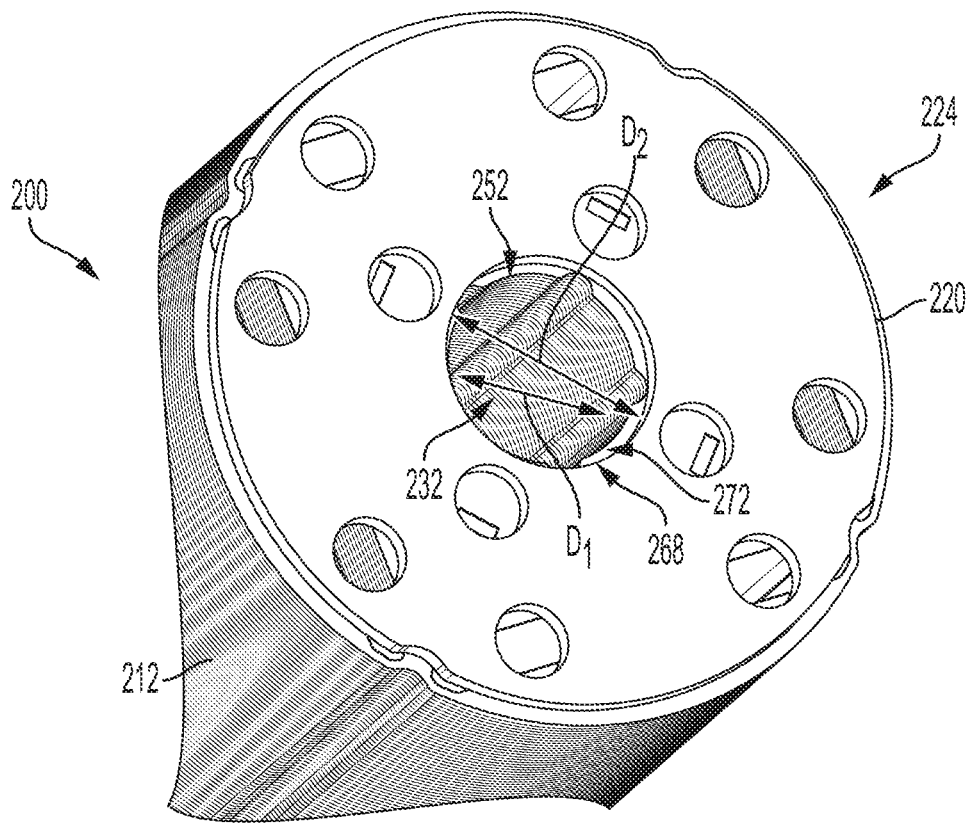
FIG. 10 is a detail view of a portion of a rotor body according to another embodiment of the present invention.

FIG. 10 illustrates another embodiment of a molded rotor assembly 200 similar to the molded rotor assembly 100 described above, with like features shown with reference numerals plus "100." The rotor assembly 200 also includes a lamination stack 212 and an integral fan and magnet retention 210, and a shaft 204 that is pressed into a central aperture 232 formed in the lamination stack 212. To avoid a risk of cracks developing in the magnet retention portion 220 during pressing, the magnet retention portion 220 may include an oversized shaft opening 268 (FIG. 10) that exposes an alternative bearing surface 272 located on the lamination stack 212. The central aperture 232 may be of a first diameter D1, measured between the press-fit portions 252, while the oversized shaft opening 268 may be of a second diameter D2 larger than D1. The rotor body 214 is supported at the alternative bearing surface 272 of the lamination stack 212 during pressing while the shaft 204 is pressed from the fan end 224. In other embodiments (not shown), the oversized shaft opening may alternatively be provided in the fan portion, so that the alternative bearing surface is located at the fan end 224. In such embodiments, the shaft 204 may be pressed from the magnet retention end while the rotor body 214 is supported at the alternative bearing surface at the fan end 224.

Figure 11:
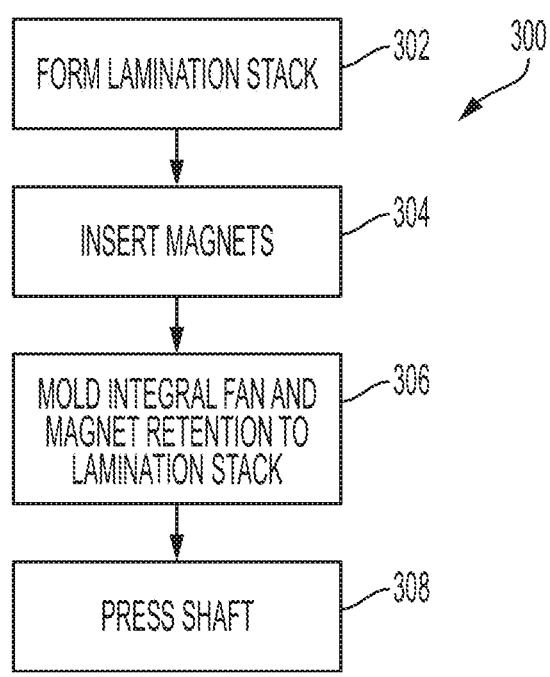
FIG. 11 is a flowchart depicting a method of manufacturing a molded rotor assembly for an electric motor.

FIG. 11 illustrates a method 300 of manufacturing a rotor assembly for an electric motor according to the present invention. In general, the illustrated method 300 includes a step 302 to form a lamination stack, a step 304 to insert permanent magnets into magnet slots formed in the lamination stack, a step 306 to mold an integral fan and magnet retention to the lamination stack to form a rotor body, and a step 308 to press a shaft into a central aperture formed in the rotor body. The method of FIG. 11 differs from prior art methods in that the pressing occurs at step 308 after the integral fan and magnet retention is molded to the lamination stack at step 306. In some embodiments, the process may omit one or more of the steps 302 and 304 yet still fall within the scope of the present invention.

Figure 12:
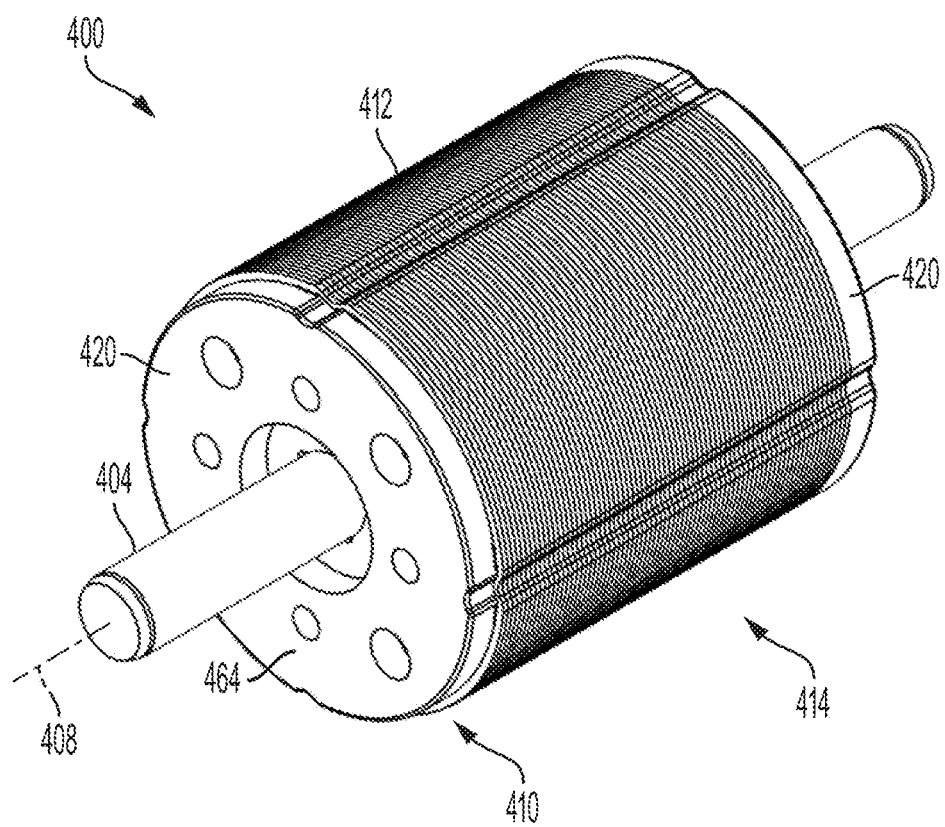
FIG. 12 is a perspective view of a rotor assembly according to another embodiment of the invention.

FIG. 12 illustrates another embodiment of a molded rotor assembly 400 similar to the molded rotor assemblies 100 described above, with like features shown with reference numerals plus "300." The rotor assembly 400 includes a shaft 404 rotatable about a longitudinal or rotational axis 408, and a rotor body 414 secured to the shaft 404 (e.g., by interference fit via the pressing method described above). The rotor body 414 includes a lamination stack 412 and an integral magnet retention 410 or main body (FIG. 12). The integral magnet retention 410 is formed of an insulative material (e.g., plastic) that is molded to the lamination stack 412 to form the rotor body 414.

Unlike the integral fan and magnet retentions 110, 210 described above, the integral magnet retention 410 does not include a fan portion. Instead, the integral magnet retention 410 includes a pair of magnet retention portions 420 abutting each axial end of the lamination stack 412. In the illustrated embodiment, the two magnet retention portions 420 are identical. When the integral magnet retention 410 is molded to the lamination stack 412, the insulative material of the magnet retention 410 flows through channels (not shown) formed in the lamination stack 412 and joins the two respective magnet retention portions 420. The insulative material also extends around the magnets within the magnet slots (not shown) to form magnet holding portions (not shown), similar to that described above with respect to FIG. 6. The magnet holding portions extend through the magnet slots between the two magnet retention portions 420, and surround the permanent magnets to retain the magnets within the slots. Each magnet retention portion 420 also defines a bearing surface 464, and the rotor body 414 can be supported at the bearing surface 464 of either of the two magnet retention portions 420 as the shaft 404 is pressed into the rotor body 414.

Although the application has been described in detail with reference to certain preferred embodiments, variations and modifications exist within the scope and spirit of one or more independent aspects of the application as described.

What is claimed is:

1. An electric motor comprising:
   a stator; and
   a rotor assembly received in the stator, the rotor assembly including
      a rotor body including a lamination stack defining a central aperture, and an integral fan and magnet retention formed by molding an insulative material to the lamination stack, and
      a shaft, including an outer surface wherein the diameter of the shaft is larger than the diameter of the central aperture, pressed into the central aperture of the rotor body, the outer surface of the shaft engaged with the central aperture of the lamination stack by an interference fit;
   wherein the shaft is pressed into the central aperture of the rotor body after the insulative material is molded to the lamination stack to form the integral fan and magnet retention.

2. The electric motor of claim 1, wherein the integral fan and magnet retention includes a fan portion and a magnet retention portion abutting opposite ends of the lamination stack, the fan portion defining a fan end of the rotor body and the magnet retention portion defining a magnet retention end of the rotor body opposite the fan end.

3. The electric motor of claim 2, wherein the lamination stack defines a plurality of injection channels extending longitudinally through the lamination stack between the fan end and the magnet retention end, and wherein the insulative material extends through the injection channels and joins the fan portion to the magnet retention portion.

4. The electric motor of claim 2, wherein the fan portion defines a bearing surface, and wherein the rotor body is configured to be supported at the bearing surface as the shaft is pressed into the rotor body.

5. The electric motor of claim 2, wherein rotor assembly includes a plurality of permanent magnets, and wherein the lamination stack defines a plurality of magnet slots that receive the permanent magnets.

6. The electric motor of claim 5, wherein the integral fan and magnet retention includes a plurality of magnet holding portions extending through the magnet slots between the fan portion and the magnet retention portion, the magnet holding portions at least partially surrounding the permanent magnets.

7. The electric motor of claim 2, wherein the lamination stack defines a central aperture that receives the shaft by interference fit, and wherein the magnet retention portion defines a shaft opening adjacent the central aperture.

8. The electric motor of claim 7, wherein the central aperture has a first diameter, and the shaft opening has a second diameter larger than the first diameter, such that the shaft opening exposes a bearing surface defined by the lamination stack.

9. The electric motor of claim 8, wherein the rotor body is configured to be supported at the bearing surface as the shaft is pressed into the rotor body.

10. The electric motor of claim 1, wherein the outer surface of the shaft is cylindrical.

11. The electric motor of claim 1, wherein the outer surface of the shaft is smooth.

12. The electric motor of claim 11, wherein the lamination stack includes press-fit portions that partially define the central aperture, and wherein the press-fit portions engage the smooth annular outer surface by interference fit to transfer torque between the shaft and the rotor body.

13. The electric motor of claim 12, wherein the central aperture is further defined by relief notches formed between adjacent press-fit portions.

\* \* \* \* \*